(12) United States Patent
Lutz et al.

(10) Patent No.: US 7,510,623 B2
(45) Date of Patent: Mar. 31, 2009

(54) METHOD FOR JOINING PIPING SYSTEMS AND PIPING TO EQUIPMENT, FIXTURES, DEVICES, STRUCTURES, AND APPLIANCES

(75) Inventors: William G. Lutz, Linwood, MI (US); Robert J. Donald, Midland, MI (US); David M. Courter, Clarkston, MI (US); Wesley J. Spaulding, Freeland, MI (US); Kalyan Sehanobish, Rochester Hills, MI (US); Shaofu Wu, Sugar Land, TX (US); Mark F. Sonnenschein, Midland, MI (US); Julien Damen, Mettmenstetten (CH)

(73) Assignee: Dow Global Technologies, Inc., Midland, MI (US)

( * ) Notice: Subject to any disclaimer, the term of this patent is extended or adjusted under 35 U.S.C. 154(b) by 158 days.

(21) Appl. No.: 10/564,590

(22) PCT Filed: Aug. 13, 2004

(86) PCT No.: PCT/US2004/026514

§ 371 (c)(1),
(2), (4) Date: Jan. 13, 2006

(87) PCT Pub. No.: WO03/041985

PCT Pub. Date: May 22, 2003

(65) Prior Publication Data

US 2006/0191623 A1    Aug. 31, 2006

(51) Int. Cl.
B29C 65/00 (2006.01)
B29C 65/48 (2006.01)
F16L 11/00 (2006.01)

(52) U.S. Cl. ............ 156/304.1; 156/304.2; 138/118; 138/120; 138/155

(58) Field of Classification Search ........... 138/118, 138/120, 155
See application file for complete search history.

(56) References Cited

U.S. PATENT DOCUMENTS

| | | |
|---|---|---|
| 5,106,928 A | 4/1992 | Skoultchi et al. |
| 5,310,835 A | 5/1994 | Skoultchi et al. |
| 5,376,746 A | 12/1994 | Skoultchi |
| 5,539,070 A | 7/1996 | Zharov et al. |
| 5,616,796 A | 4/1997 | Pocius et al. |
| 5,621,143 A | 4/1997 | Pocius |
| 5,681,910 A | 10/1997 | Pocius |
| 5,686,544 A | 11/1997 | Pocius |
| 5,690,780 A | 11/1997 | Zharov et al. |
| 5,691,065 A | 11/1997 | Zharov et al. |
| 5,718,977 A | 2/1998 | Pocius |
| 5,795,657 A | 8/1998 | Pocius |
| 6,286,821 B1 | 9/2001 | Schaffer |

(Continued)

FOREIGN PATENT DOCUMENTS

EP    0001482    *    4/1979

(Continued)

*Primary Examiner*—Justin Fischer (57) ABSTRACT

A method to join pipe is disclosed using a curable one or two part adhesive composition comprising an effective amount of a boron containing initiator compound such as an organoborate, a stabilized organoborane complex, or combinations thereof; one or more monomers, oligomers, polymers or mixtures thereof having olefinic unsaturation which is capable of polymerization by free radical polymerization; and optionally a decomplexing agent.

14 Claims, 5 Drawing Sheets

U.S. PATENT DOCUMENTS

| | | |
|---|---|---|
| 6,740,716 B2 | 5/2004 | Webb et al. |
| 6,762,260 B2 | 7/2004 | Sonnenschein et al. |
| 6,777,512 B1 | 8/2004 | Sonnenschein et al. |
| 6,806,330 B1 | 10/2004 | Sonnenschein et al. |
| 2003/0120005 A1* | 6/2003 | Webb et al. .................. 526/134 |

FOREIGN PATENT DOCUMENTS

| | | | |
|---|---|---|---|
| EP | 1029906 | * | 8/2000 |
| GB | 2003243 | * | 3/1979 |
| JP | 1112326 | * | 5/1968 |
| JP | 60006434 | * | 1/1985 |
| JP | 11311392 | * | 11/1999 |
| WO | WO98/32207 | | 7/1998 |
| WO | WO03/018699 | | 3/2003 |
| WO | WO03/041985 | | 5/2003 |

* cited by examiner

METHOD FOR JOINING PIPING SYSTEMS AND PIPING TO EQUIPMENT, FIXTURES, DEVICES, STRUCTURES, AND APPLIANCES

The present invention relates generally to a method of joining a pipe to an object, and more particularly to joining a pipe to an object with a curable one or two part adhesive composition comprising a boron containing initiator compound, one or more monomers, oligomers, polymers or mixtures thereof having olefinic unsaturation which is capable of polymerization by free radical polymerization, and optionally a decomplexing agent.

BACKGROUND OF THE INVENTION

Thermoplastic polymers are used widely to manufacture articles such as pipes and pipe fittings which require good corrosion and chemical resistance, low weight and good fabricability for use in transportation of gases, liquids, solids, slurries or the likes under pressure and non-pressure conditions or for protection of sensitive components, such as fiber-optics or cables. These applications frequently require connections between pipes and/or other objects. The joining of articles made of thermoplastic material may be accomplished by mechanical means such as threaded connections, couplings, flanges; chemical means such as solvent cementing, or by thermal means such as fusion bonding Mechanical joints generally work well for small diameter pipes and non-pressure applications, but they are not cost competitive or technically suitable for large diameter pipe and/or pressure piping systems.

Solvent cementing is widely utilized for some thermoplastics, for example for polyvinylchloride pipe and fittings. Typically solvent bonding utilizes a solvent-based primer or cleaner to prepare the surfaces to be bonded and a solvent cement system that contains solvent(s) and resin in conjunction with an interference fit joint. Solvent cements may be used without primers or cleaners, however, joint integrity may be compromised. However, interference fit joints limit the ability to accurately lay out the pipe and fittings prior to cementing. Adhesive primers are widely used with solvent-based cement systems for poly(vinylchloride) and chlorinated poly(vinylchloride) piping systems to insure acceptable joint bonding. However, primers release as much as 650 grams per liter of volatile organic compounds (VOCs) into the environment. Moreover, the bonding strength can be inconsistent and solvent-based systems do not work well with many thermoplastic pipes and fitting materials, for example polyolefins.

A common method of joining pipe is butt fusion welding. It is commonly used for large diameter pipes and relatively simple layouts. Three important factors effecting satisfactory butt fusion joints are absence of contamination, sufficient heat input, and good final morphology of the weld. Failure to achieve any of the above can lead to an unsatisfactory pipe joint, for instance pipe leakage. Further, butt fusion requires a large welding machine and generator.

A pipe may be thermally bonded to a fitting by providing a diametrically enlarged female portion on the fitting, heating the inside of the enlarged portion and the outside of the end of the pipe to fuse the thermoplastic on each, and forcing the pipe end into the enlarged portion while the thermoplastic is in a somewhat fluid state. Upon cooling, the fused thermoplastic materials join and bond the articles together.

However, when articles are joined by the conventional thermal bonding approach described above, the joint may not be satisfactory, as some of the fused thermoplastic may be forced into the inside of the fitting and pipe to impede fluid flow, and because there may be leakage paths through the joint resulting from the sticking of the fused thermoplastic to the tooling of the heating unit. Further, because specialized equipment is required, fusion bonding may be acceptable to the professional, but it is not practical for the increasing Do It Yourself (DIY) market.

There have been attempts to overcome the deficiencies of conventional thermal fusion bonding by providing an electrically resistant heating coil or element positioned adjacent to the inside or imbedded in the surface of the fitting to be welded. This process is known as electrofusion. However, if done improperly, incomplete fusion can result. Furthermore, thermal fusion bonding by any of the above methods is difficult or impossible for joining pipes or pipe systems made of different thermoplastic resins.

Conventional pipe joining methods may further require time consuming and costly surface treatments such as corona, flame, or plasma treatment to achieve strong and monolithic joints.

Accordingly, there has been a need for a process to form extensive, continuous, economical, and strong joints between thermoplastic, especially polyolefin, pipes and other pipes or objects with lower VOC emissions and which is convenient and economical. The present invention fulfills this need.

SUMMARY OF THE INVENTION

The present invention is such a process for joining a pipe with a first surface and an object, capable of being joined to a pipe, having a second surface, comprising the steps of applying an effective amount of a curable one or two part adhesive composition to the first surface of the pipe, the second surface of the object or to both surfaces, wherein the adhesive comprises an effective amount of a boron containing initiator compound, one or more monomers, oligomers, polymers or mixtures thereof having olefinic unsaturation which is capable of polymerization by free radical polymerization, and optionally a decomplexing agent and joining the first surface of the pipe with the second surface of the object. An object can be, for example, a second pipe, a fitting, a manhole manifold, a container, a drum, a duct, a profile, a tank, a tape, a vessel, a structure, a device, an appliance, a fixture, or the like.

Another embodiment of the present invention is joining a first thermoplastic pipe having a spigot with an exterior surface to a second thermoplastic object having a bell fitting with an interior surface comprising the steps of applying an effective amount of a curable one or two part adhesive composition to the exterior surface of the spigot, the interior surface of the bell or to both surfaces and inserting the spigot into the bell, wherein the adhesive comprises an effective amount of a stabilized organoborane amine complex initiator and a polymerizable acrylic monomer and the first thermoplastic may be the same or different from the second thermoplastic.

In another embodiment of the present invention there is a gap between the exterior surface of the spigot and the interior surface of the bell which receives an effective amount of adhesive, preferably a uniform gap receiving a uniform thickness of adhesive. Preferably, the gap comprises a channel in the bell, alignment guides raised from the interior surface of the bell which contact the exterior surface of the spigot, a guide ring fitted into an end of the bell said guide ring having a smaller internal diameter than the bell, a mesh collar of constant thickness, a gasket, a serrated washer, or combinations thereof. The spigot or pipe may also comprise the channel, or alignment guides, it may also have a reduced outside diameter to accept a mesh collar of constant thickness, or a uniformly reduced outside diameter of a length less than the bell length to accept an effective amount of adhesive, or combinations thereof.

In another embodiment of the present invention, the pipe and the object it is being joined to comprise interlocking screw threads.

In another embodiment of the present invention the pipe and the object may independently comprise a metal; a multilayer composite, that is, multilayer plastic or multilayer plastic and metal; a thermoset; or a thermoplastic such as chlorinated poly(vinylchloride), poly(vinylchloride), acrylonitrile, butadiene and styrene terpolymer, a polyolefin, preferably polyethylene or polypropylene; or blends thereof.

Yet another embodiment of the present invention is repairing a new or existing pipe, object, or pipe/object joint having a surface in need of repair by bonding a repair patch, such as a liner, collar, tape, sheet or the like, to the surface in need of repair, such as the inner or outer surface of the pipe, object, or pipe/object joint, by applying an effective amount of a curable one or two part adhesive composition to the surface in need of repair, that is, to the exterior or interior surface of the pipe, object or pipe/object joint and/or to one or more surface of the repair patch, wherein the adhesive comprises an effective amount of a stabilized organoborane amine complex initiator and one or more monomers, oligomers, polymers or mixtures thereof having olefinic unsaturation which is capable of is polymerization by free radical polymerization and bonding the repair patch to the surface in need of repair.

In yet another embodiment of the present invention the boron containing initiator compound comprises at least one of:

(i) an organoborate having the following structure:

wherein B represents boron; $R^{20}$ is $C_1$-$C_{10}$ alkyl; $R^{21}$ is independently in each occurrence $C_1$-$C_{10}$ alkyl, $C_3$-$C_{10}$ cycloalkyl, phenyl, phenyl-substituted $C_1$-$C_{10}$ alkyl or phenyl substituted $C_3$-$C_{10}$ cycloalkyl, provided that any two of $R^{20}$ and/or $R^{21}$ may optionally be part of a carbocyclic ring; and $M^+$ is a metal ion or a quaternary ammonium ion,

(ii) an internally blocked borate having the following structure:

wherein B represents boron; J is oxygen or sulfur; when J represents oxygen, n is the integer 2, 3, 4 or 5; when J represents sulfur, n is the integer 1, 2, 3, 4 or 5; $R^{30}$, $R^{31}$, $R^{32}$ and $R^{33}$ are independently, substituted or unsubstituted alkyl or alkylene groups containing 1 to 10 carbon atoms, substituted aryl groups having up to 7 to 12 carbon atoms or unsubstituted aryl groups; $R^{31}$, $R^{32}$ and $R^{33}$ can be hydrogen; $R^{30}$ can be part of a second unsubstituted or substituted cyclic borate; $R^{30}$ can comprise a spiro ring or a spiro-ether ring; $R^{30}$ together with $R^{31}$ can be linked to form a cycloaliphatic ring; or $R^{30}$ together with $R^{31}$ can comprise a cyclic ether ring and M is any positively charged species; with m being greater than 0, (iii) a hydroxide/alkoxide organoborane initiator having the following structure:

wherein B represents boron; $R^{40}$, $R^{41}$, and $R^{42}$ independently are alkyl groups having 1 to 10 carbon atoms and phenyl containing groups; $R^{43}$ is a hydrogen or an organic group; M+ represents a monovalent cation such as a Group IA metal cation or onium or a multivalent cation, such as a Group IIA metal, and (iv) an organoborane amine complex having the following structure:

wherein B represents boron; and $R^2$ is separately in each occurrence a $C_{1-10}$ alkyl, $C_{3-10}$ cycloalkyl, or two or more of $R^2$ may combine to form a cycloaliphatic ring; and Am is an amine. Among preferred organoboranes are tri-ethyl borane, tri-isopropyl borane and tri-n-butylborane.

In yet another embodiment of the present invention, the amine is a primary amine; a secondary amine; a polyamine having primary or secondary amines or both; ammonia; polyoxyalkylene amines; the reaction product of a diamine and a difunctional compound having moieties which react with an amine, wherein the reaction product has terminal amine groups; aryl amines; heterocylic amines; a compound having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines or a mixture thereof.

In yet another embodiment of the invention the adhesive comprises a decomplexing agent selected from a Lewis acid, a BrØ527 nsted acid, an anhydride, an isocyanate, a sulfonic acid chloride, methacrylic acid, or an adduct of maleic anhydride and hydroxyethyl methacrylate.

In yet another embodiment of the present invention, the adhesive composition further comprises an effective amount of an isocyanate containing compound; one or more unpolymerized or partially polymerized compound having ring opening heterocyclic moieties and optionally a Lewis acid catalyst capable of initiating polymerization of the compound containing heterocyclic moieties; one or more compound, oligomer or prepolymer having siloxane groups and reactive moieties in its backbone capable of polymerization; one or more compound, oligomer or prepolymer having siloxane groups in its backbone which contain a moiety which when exposed to moisture forms an acid capable of decomplexing the organoborane amine complex; or mixtures thereof.

DETAILED DESCRIPTION OF THE INVENTION

Any pipe and object capable of being joined to a pipe are suitable for the present invention. A pipe is defined herein as a hollow body for conducting and/or containing solids, liquids, gasses and mixtures thereof (such as a slurry), preferably tubular or cylindrical in shape. The pipe can be rigid or flexible. Examples of pipes are pipes, tubes, hoses, conduits, ducts, fittings, cable insulation, and the like. An object may be a second pipe, a fitting for joining two segments of pipe (that is, a first pipe and a second pipe), an object which has one or more pipes joined to it, for example a tank, a manhole manifold, a container, a drum, a duct, a profile, a vessel, a structure, a device, an appliance, a fixture, and the like. In one embodiment, the pipe and object may independently comprise a metal, such as steel, copper, aluminum, and the like; a multilayer composite, comprising multi layers of plastic and/or multi layers of plastic and metal; a thermoset, such as epoxies, vinyl esters, polyesters, furans and the like; a thermoplastic; or mixtures thereof. Preferably, the pipe and object of the present invention are a thermoplastic polymer. The pipe and object may be made from the same or different thermoplastic polymers. Any thermoplastic polymer capable of being formed into a pipe and object capable of being joined to a pipe is suitable. Preferable thermoplastic polymers include virgin thermoplastic polymers, recycled thermoplastic polymers, and/or blends thereof including poly(vinylchloride); chlorinated poly(vinylchloride); acrylonitrile, butadiene, and styrene terpolymer (ABS); poly(vinylidene fluoride) (PVDF); polyacetal, also known as polyoxymethylene (POM); polyamide (PA); and polyolefin (PO) such as cross-linked polyethylene (PEX), polybutylene (PB), preferably polyethylene (PE) or polypropylene (PP); and blends thereof, such as PVC/ABS.

Polyethylene is particularly suitable for use in the present invention, preferably low density polyethylene (LDPE), linear low density polyethylene (LLDPE), medium density polyethylene (MDPE), high density polyethylene (HDPE), crossed-linked polyethylene (PEX), and the like. The polyethylene can be a homopolymer, copolymer with an alpha-olefin or mixture thereof. Preferably alpha-olefins are a $C_3$ to $C_{20}$ alpha-olefin, more preferably propylene, 1-butene, methyl-4-pentene, 1-hexene, and 1-octene.

Methods to make polyethylene are well known and include using various polymerization techniques, including high pressure free radical polymerization processes, solution processes, slurry processes and gas phase processes. Solution processes such as that disclosed in U.S. Pat. No. 4,076,698 are suitable. U.S. Pat. No. 4,076,698 discloses heterogeneously branched polyethylene having a relatively broad molecular weight distribution (MWD). Catalyst systems for the various polymerization processes include Ziegler Natta catalyst technology, such as that shown in U.S. Pat. No. 4,076,698, but also include single site catalyst technology, such as that disclosed in U.S. Pat. Nos. 3,645,992 and 5,064,802 (constrained geometry catalyst technology). The technology disclosed in U.S. Pat. No. 3,645,992 results in homogeneously branched linear polyethylene having a very narrow MWD. The catalyst technology of U.S. Pat. No. 5,064,802, when used in a continuous polymerization process, results in substantially linear polyethylene (having long chain branching levels of 0.01 to 3 long chain branches per 1000 carbons, but also having a very narrow MWD). Other (metallocene) catalyst technology includes that disclosed in U.S. Pat. Nos. 5,026,798 and 5,055,438. Examples of the substantially linear polyethylene can be found in U.S. Pat. Nos. 5,272,236; 5,278,272; and 5,665,800. All of the cited United States Patents are hereby incorporated by reference in their entirety. A preferred polyethylene is disclosed in pending U.S. application Ser. No. 10/222,273 hereby incorporated by reference.

Lower viscosity polyethylene may preferably be employed, for example, for injection molding. The melt flow rate (MFR) of the lower viscosity polyethylene useful in the present invention is generally equal to or greater than about 1 gram/10 minutes (g/10 min.), preferably equal to or greater than about 2 g/10 min., more preferably equal to or greater than about 5 g/10 min., and most preferably equal to or greater than about 10 g/10 min. The melt flow rate for lower viscosity polyethylene useful for the present invention is generally equal to or less than about 1000 g/10 min., preferably equal to or less than about 500 g/10 min., and most preferably equal to or less than about 50 g/10 min. Unless otherwise stated, melt flow rate for lower viscosity PE resins is determined according to ASTM D 1238 at 190° C. and an applied load of 2.16 kilogram (kg).

Alternatively, a higher viscosity polyethylene may preferably be employed, for example, for blow molding, rotational molding and extrusion. The MFR of the higher viscosity polyethylene useful in the present invention is generally equal to or greater than about 0.1 g/10 min. and preferably equal to or greater than about 0.2 g/10 min. The melt flow rate of the higher viscosity polyethylene useful herein for extrusion is generally equal to or less than about 2 g/10 min., preferably equal to or less than about 1 g/10 min., and more preferably equal to or less than about 0.8 g/10 min. Melt flow rate for the higher viscosity PE is determined according to ASTM D 1238 at 190° C. and an applied load of 5 kg.

The polypropylene suitable for use in this invention is well known in the literature and can be prepared by known techniques. In general, the polypropylene is in the isotatic form, although other forms can also be used (for example, syndiotatic or atactic). The polypropylene used for the present invention is preferably a homopolymer of polypropylene or a copolymer, for example, a random or block copolymer, of propylene and an alpha-olefin, preferably a $C_2$, or $C_4$ to $C_{20}$ alpha-olefin. Preferred alpha-olefins for constituting the propylene and alpha-olefin copolymer include ethylene, 1-butene, 4-methylpentene, 1-hexene, and 1-octene. The alpha-olefin is present in the polypropylene of the present invention in an amount equal to or less than about 20 percent by mole, preferably equal to or less than about 15 percent, even more preferably equal to or less than about 10 percent and most preferably equal to or less than about 5 percent by mole.

A preferred polypropylene is an isotactic polypropylene having a high degree of crystallinity. A preferable method of determining the degree of crystallinity in polypropylene is by differential scanning calorimetry (DSC). As defined herein, a high degree of crystallinity, as determined by DSC, is at least 40 weight percent, more preferably at least 50 weight percent, even more preferably at least 62 weight percent, even more preferably at least 64 weight percent and most preferably at least 68 weight percent based on the weight of the polypropylene. The degree of crystallinity for the polypropylene as determined by DSC is less than or equal to about 100 weight percent, preferably less than or equal to about 90 weight percent, more preferably less than or equal to about 80 weight percent, and most preferably less than or equal to about 70 weight percent based on the weight of the polypropylene.

A preferred polypropylene is a coupled polypropylene. For the purpose of coupling, the polypropylene is reacted with a polyfunctional compound which is capable of insertion reactions into carbon-hydrogen bonds. Compounds having at least two functional groups capable of insertion into the carbon-hydrogen bonds of CH, $CH_2$, or $CH_3$ groups, both aliphatic and aromatic, of a polymer chain are referred to herein as coupling agents. A preferred coupling agent is a poly(sulfonyl azide), more preferably a bis(sulfonyl azide). Examples of poly(sulfonyl azides) useful for the invention are described in WO 99/10424. Preferred poly(sulfonyl azide)s include 4,4' oxy-bis-(sulfonylazido)benzene, 2,7-naphthalene bis(sulfonyl azide), 4,4'-bis(sulfonyl azido)biphenyl, 4,4'-diphenyl ether bis(sulfonyl azide) and bis(4-sulfonyl azidophenyl)methane, and mixtures thereof.

One skilled in the art knows that an effective amount of coupling agent is dependent on the coupling agent selected and the average molecular weight of the polypropylene. Typically, the lower the molecular weight of the polypropylene, the more coupling agent needed. An effective amount of coupling agent is an amount sufficient to result in adequate melt strength for forming pipe and/or fittings, but less than a cross-linking amount. Generally, an effective amount of poly(sulfonyl azide) for coupling is equal to or greater than about 50 parts per million (ppm), preferably equal to or greater than about 75 ppm, more preferably equal to or greater than about 100 ppm and most preferably equal to or greater than about 150 ppm by weight based on the weight of the polypropylene. Formation of cross-linked polypropylene is to be avoided, therefore the amount of bis (sulfonyl azide) is limited to equal to or less than about 2000 ppm, preferably equal to or less than about 1500 ppm and more preferably equal to or less than about 1300 ppm by weight based on the weight of the polypropylene.

Lower viscosity polypropylene may preferably be employed, for example, for injection molding. The MFR of the lower viscosity polypropylene useful in the present is generally equal to or greater than about 1 g/10 min., preferably equal to or greater than about 5 g/10 min., and most preferably equal to or greater than about 10 g/10 min. The melt flow rate for the lower viscosity polypropylene useful herein for injection molding is generally equal to or less than about 50 g/10 min., preferably equal to or less than about 40 g/10 min., and most preferably equal to or less than about 35 g/10 min. Unless otherwise stated, melt flow rate for polypropylene is determined according to ASTM D 1238 at 230° C. and an applied load of 2.16 kg.

Alternatively, higher viscosity polypropylene may preferably be employed, for example, for blow molding, rotational molding and extrusion. The MFR of the higher viscosity polypropylene useful in the present invention is generally equal to or greater than about 0.1 g /10 min., preferably equal to or greater than about 0.2 g/10 min., and most preferably equal to or greater than about 0.3 g/10 min. The melt flow rate of the higher viscosity polypropylene useful herein is generally equal to or less than about 10 g/10 min., preferably equal to or less than about 5 g/10 min., and most preferably equal to or less than about 1 g/10 min.

The adhesive for joining the pipe and object of the present invention preferably comprises a boron containing initiator compound, one or more monomers, oligomers, polymers or mixtures thereof having olefinic unsaturation which is preferably capable of polymerization by free radical polymerization, and optionally a decomplexing agent. The boron containing initiator compound of the present invention is preferably an organoborate, a stabilized organoborane complex, or combinations thereof. Preferably, the adhesive for joining the pipe and object of the present invention is (1) a curable one part adhesive composition comprising an effective amount of the boron containing initiator compound and at least one polymerizable monomer or (2) a two part adhesive composition comprising in one part an effective amount of a boron containing initiator compound and in another part at least one polymerizable monomer.

An organoborate is a salt of a positive cation and an anionic tetravalent boron. Any organoborate which can be converted to an organoborane by contact with a decomplexing agent sometimes referred to as an activating agent, a deblocking agent or initiator, may be used. One class of preferred organoborates, (also known as quaternary boron salts) is disclosed in Kneafsey et al., US 2003/0226472 and Kneafsey et al., US 2004/0068067, both incorporated herein by reference. Preferred organoborates disclosed in these two U.S. Patent applications are described by the following structure:

wherein B represents boron; $R^{20}$ is $C_1$-$C_{10}$ alkyl; $R^{21}$ is independently in each occurrence $C_1$-$C_{10}$ alkyl, $C_3$-$C_{10}$ cycloalkyl, phenyl, phenyl-substituted $C_1$-$C_{10}$ alkyl or phenyl substituted $C_3$-$C_{10}$ cycloalkyl, provided that any two of $R^{20}$ and/or $R^{21}$ may optionally be part of a carbocyclic ring; and $M^+$ is a metal ion or a quaternary ammonium ion. Preferred examples of organoborates include sodium tetraethyl borate, lithium tetraethyl borate, lithium phenyl triethyl borate and tetramethylammonium phenyl triethyl borate.

In another embodiment, the organoborate is an internally blocked borate as disclosed in Kendall et al., U.S. Pat. No. 6,630,555, incorporated herein by reference. Disclosed in U.S. Pat. No. 6,630,555 are four coordinate internally blocked borates wherein the boron atom is part of a ring structure further containing an oxa or thio-moiety. The internally blocked heterocyclic borates preferably have the following structure:

wherein B represents boron; J is oxygen or sulfur; when J represents oxygen, n is the integer 2, 3, 4 or 5; when J represents sulfur, n is the integer 1, 2, 3, 4 or 5; $R^{30}$, $R^{31}$, $R^{32}$ and $R^{33}$ are independently, substituted or unsubstituted alkyl or alkylene groups containing 1 to 10 carbon atoms, substituted aryl groups having up to 7 to 12 carbon atoms or unsubstituted aryl groups; $R^{31}$, $R^{32}$ and $R^{33}$ can be hydrogen; $R^{30}$ can be part of a second unsubstituted or substituted cyclic borate; $R^{30}$ can comprise a spiro ring or a spiro-ether ring; $R^{30}$ together with $R^{31}$ can be linked to form a cycloaliphatic ring; or $R^{30}$ together with $R^{31}$ can comprise a cyclic ether ring and M is any positively charged species; with m being greater than 0.

The term "internally blocked" in reference to the organoborates described herein means a four coordinate boron atom being part of an internal ring structure bridged across two of the four boron coordinates or valences. Internal blocking includes a single ring or a two-ring structure where boron is part of one or multi-ring structures. These internally blocked borates exhibit unexpected stability in the blocked state, they ready react with deblocking or decomplexing agents to form the organoborane initiator, which rapidly initiats polymerization in the unblocked state.

Suitable activating or decomplexing agents to liberate the active organoborane initiator from the internally blocked organoborate are acids such as Lewis and/or BrØnsted acids, anhydrides, isocyanates, and sulfonic acid chlorides. Particularly suitable decomplexing agents are methacrylic acid and an adduct of maleic anhydride and hydroxyethyl methacrylate (MA-HEMA).

The decomplexing agent should be used in an amount to promote polymerization. Generally, the decomplexing agent should be used in an amount equal to or greater than about 30 mol percent, preferably equal to or greater than about 80 mol percent and most preferably equal to or greater than about 100 mol percent based on the number of equivalents of boron containing initiator compound. Generally, the decomplexing agent should be used in an amount equal to or less than about 540 mol percent, preferably equal to or less than about 350 mol percent and most preferably equal to or less than about 200 mol percent based on the number of equivalents of boron containing initiator compound.

In another embodiment, the boron containing initiator compound comprises at least one complexed hydroxide/alkoxide organoborane initiator comprising a complexing agent comprising at least one hydroxide salt and an organoborane initiator and/or a complex comprising a complexing agent comprising at least one alkoxide salt and an organoborane initiator. Such complexed hydroxide/alkoxide organoborane initiators are disclosed in U.S. Pat. No. 6,486,090 which is incorporated herein in its entirety. The complexed hydroxide/alkoxide organoborne initiators preferably have the following structure:

wherein B represents boron; $R^{40}$, $R^{41}$, and $R^{42}$ independently are alkyl groups having 1 to 10 carbon atoms and/or phenyl containing groups; $R^{43}$ is a hydrogen (e.g., hydroxide organoborane initiator) or an organic group (for example, alkoxide organoborane initiator); M+ represents a monovalent cation such as a Group IA metal cation or onium or a multivalent cation, such as a Group IIA metal. These complexed hydroxide/alkoxide organoborane initiators ready react with decomplexing agents to form the organoborane initiator, which rapidly initiates polymerization in the unblocked state.

Preferably, activating or decomplexing agents, such as those discussed herein above, are useful for liberating the active organoborane initiator from the complexed hydroxide/alkoxide organoborane initiators.

In yet another embodiment, a suitable adhesive for joining the pipe and object of the present invention is a curable one part adhesive composition comprising an effective amount of a stabilized organoborane amine complex initiator and a polymerizable acrylic monomer or a two part adhesive composition comprising in one part an effective amount of a stabilized organoborane amine complex initiator and in another part one or more monomers, oligomers, polymers or mixtures thereof having olefinic unsaturation which is preferably capable of polymerization by free radical polymerization, preferably a polymerizable acrylic monomer. Such adhesives are known in the art, see U.S. Pat. Nos. 5,106,928; 5,286,821; 5,310,835; 5,376,746; 5,539,070; 5,690,780; 5,691,065; 5,616,796; 5,621,143; 5,681,910; 5,686,544; 5,718,977; 5,795,657; 5,686,544; and U.S. patent application Ser. Nos. 09/466,321; 10/012,629; 10/095,326; and 10/377,440 all of which are incorporated herein by reference.

The organoborane used in the complex is a trialkyl borane or an alkyl cycloalkyl borane. Preferably such organoboranes corresponds to the formula $$B-(R^2)_3$$

wherein B represents boron; and $R^2$ is separately in each occurrence a $C_{1-10}$ alkyl, $C_{3-10}$ cycloalkyl, or two or more of $R^2$ may combine to form a cycloaliphatic ring. Preferably $R^2$ is $C_{1-4}$ alkyl, even more preferably $C_{2-4}$ alkyl, and most preferably $C_{3-4}$ alkyl. Among preferred organoboranes are triethyl borane, tri-isopropyl borane and tri-n-butylborane.

In the organoborane amine complex, the organoborane is a trivalent organoborane and the amine can be any amine which complexes reversibly with the organoborane. Such complexes are represented by the formula:

wherein $R^2$ is described hereinbefore and Am is an amine. The amines used to complex the organoborane compound can be any amine or mixture of amines which complex the organoborane and which can be decomplexed when exposed to a decomplexing agent. The desirability of the use of a given amine in an amine/organoborane complex can be calculated from the energy difference between the Lewis acid-base complex and the sum of energies of the isolated Lewis acid (organoborane) and base (amine) known as binding energy. The more negative the binding energy the more stable the complex.

Preferred amines include amine comprises a primary amine; a secondary amine; a polyamine having primary or secondary amines or both; ammonia; polyoxyalkylene amines; the reaction product of a diamine and a difunctional compound having moieties which react with an amine, wherein the reaction product has terminal amine groups; aryl amines; heterocylic amines; a compound having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines or a mixture thereof.

Most preferred amines are selected from the group of amines having an amidine structural component; aliphatic heterocycles having at least one nitrogen in the heterocyclic ring wherein the heterocyclic compound may also contain one or more nitrogen atoms, oxygen atoms, sulfur atoms, or double bonds in the heterocycle; an alicyclic compound having bound to the ring a substituent having an amine moiety wherein the alicyclic compound may have a second substituent which can contain one or more nitrogen, oxygen or sulfur atoms and/or one or two double bonds; primary amines which in addition to a primary amine have one or more hydrogen bond accepting groups of an ether, polyether, thioether or halogen wherein there is an alkylene chain of at least two carbon atoms between the primary amine and the hydrogen bond accepting group, and conjugated imines. For example, the complex of the organoborane and the primary amine corresponds to the formula the organoborane heterocyclic amine complex corresponds to the formula the organoborane amidine complex corresponds to the formula the organoborane conjugated imine complex corresponds to the formula and the amine substituted alicyclic compound complex corresponds to the formula wherein B is boron;

$R^1$ is separately in each occurrence hydrogen, a $C_{1-10}$ alkyl or $C_{3-10}$ cycloalkyl;

$R^2$ is separately in each occurrence a $C_{1-10}$ alkyl, $C_{3-10}$ cycloalkyl or two or more of $R^2$ may combine to form a cycloaliphatic ring structure;

$R^3$ is separately in each occurrence hydrogen, a $C_{1-10}$ alkyl, $C_{3-10}$ cycloalkyl or forms a double bond with a $R^3$ or $R^4$ on an adjacent atom;

$R^4$ is separately in each occurrence hydrogen, $C_{1-10}$ alkyl, $C_{3-10}$ cycloalkyl, $C_{6-10}$ aryl or $C_{6-10}$ alkaryl;

$R^5$ and $R^6$ are separately in each occurrence hydrogen, $C_{1-10}$ alkyl, $C_{3-10}$ cycloalkyl, $N(R^4)_2$ wherein $R^7$ is separately in each occurrence hydrogen, $C_{1-10}$ alkyl, $C_{3-10}$ cycloalkyl or two or more of $R^5$, $R^6$ and $R^7$ in any combination can combine to form a ring structure which can be a single ring or a multiple ring structure and the ring structure can include one or more of nitrogen, oxygen or unsaturation in the ring structure;

$R^9$ is independently in each occurrence hydrogen, $C_{1-10}$ alkyl or $C_{3-10}$ cycloalkyl, Y, $—(C(R^9)_2—(CR^9{=}CR^9)_c—Y$ or two or more of $R^9$ can combine to form a ring structure, or one or more of $R^9$ can form a ring structure with Y provided the ring structure is conjugated with respect to the double bond of the imine nitrogen;

$R^{10}$ is separately in each occurrence $C_{1-10}$ alkyl, $C_{3-10}$ cycloalkyl or $—(C(R^1)_2)_d—W$;

W is separately in each occurrence hydrogen, $C_{1-10}$ alkyl or X;

X is $OR^{10}$, $SR^{10}$ or a halogen;

Y is independently in each occurrence hydrogen, $SR^4$, $N(R^4)_2$, $OR^4$, $C(O)OR^4$, a halogen or an alkylene group which forms a cyclic ring with $R^7$ or $R^9$;

Z is separately in each occurrence oxygen or $—NR^4$;

a is separately in each occurrence an integer of from about 1 to about 10;

b is separately in each occurrence 0 or 1, with the proviso that the sum of a and b should be from about 2 to about 10;

c is separately in each occurrence an integer of from about 1 to about 10;

d is separately in each occurrence an integer of about 1 to about 4;

x is separately in each occurrence an integer of about 1 to about 10, with the proviso that the total of all occurrences of x is from about 2 to about 10; and y is separately in each occurrence 0 or 1.

In another preferred embodiment the amine further contains siloxane, that is an amino siloxane. Any compound with both amine and siloxane units wherein the amine has sufficient binding energy as described hereinbefore with the organoborane, may be used. Preferably the siloxane moiety will permit this component to participate in polymerization of the siloxane monomers, oligomers, and/or polymers. The siloxane containing monomers, oligomers, and/or polymers can be any compound which contains silicone. Preferably the siloxane compound has reactive functionality. Preferable reactive functionalities include hydride, olefinic unsaturation, hydroxyl, and hydrolyzable moieties that hydrolyze to form a silanol moiety. The adhesive composition my further comprise a catalyst for the polymerization of the one or more compounds, oligomers or prepolymers having a siloxane backbone and reactive moieties capable of polymerization.

Preferred amino siloxanes are represented by one of the formulas:

wherein
B represents boron;
$R^2$ is separately in each occurrence $C_{1-10}$ alkyl, $C_{3-10}$ cycloalkyl, or two or more of $R^2$ may combine to form a cycloaliphatic ring;
Q is a hydrolyzable moiety;
$R^{11}$ is independently in each occurrence hydrogen, alkyl, alkoxy, alkenyl, alkyl amino or corresponds to the formula $((CR^{14}H)_rO)_n$—$(NR^4)$—$(CH_2)_o$—$NH_2$ with the proviso that at least $(R^{11})'$ is a primary amine leave this as is;
$R^{12}$ is independently in each occurrence hydrogen, alkyl, aryl, alkoxy, and may further contain one or more primary, secondary or tertiary amines;
$R^{14}$ is separately in each occurrence hydrogen or alkyl;
$R^4$ is hydrogen, $C_{1-10}$ alkyl, $C_{6-10}$ aryl or $C_{7-10}$ alkaryl;
a is a number of form 1 to 10;
b is a number of from 0 to 1;
m is separately in each occurrence a whole number of 1 or greater;
p is separately in each occurrence a number of from 1 to 3;
q is separately in each occurrence an integer from 1 to 2 wherein the sum of p and q on each silicon atom is 3;
n is separately in each occurrence an integer of about 4 to about 400;
o is separately in each occurrence an integer of about 1 to about 9; and
r is separately in each occurrence an integer of 2 or 4.

Polymerizable compounds which may be used in the polymerization compositions of the invention include any monomers, oligomers, polymers or mixtures thereof which contain olefinic unsaturation which can polymerize by free radical polymerization. Such compounds are well known to those skilled in the art and are described in U.S. Pat. No. 3,275,611, incorporated herein by reference. Among preferred classes of compounds containing olefinic unsaturation are monomers, oligomers, polymers and mixtures thereof derived from the acrylates and methacrylates and one or more monomers, oligomers, or polymers having a siloxane backbone and containing acrylate functional moieties. The most preferred acrylate and methacrylate compounds include methyl acrylate, ethyl acrylate, 2-hydroxyethyl acrylate, 4 hydroxyethyl acrylate, 2-carboxyethyl acrylate, ethyleneglycolmethyl ether acrylate, 2,2,2 trifluorethyl acrylate, methylmethacrylate, butylmethacrylate, 2-ethylhexylmethacrylate, isobornylmethacrylate, tetrahydrofurfuryl methacrylate, and cyclohexylmethylmethacrylate.

In some embodiments the polymerizable compositions of the invention may further comprise an effective amount of a compound that is reactive with an amine so as to liberate the organoborane so as to initiate polymerization (a decomplexing agent). The amine reactive compound liberates organoborane by reacting with the amine, thereby removing the organoborane from chemical attachment with the amine. Desirable amine reactive compounds are those materials that can readily form reaction products with amines at or below and more preferably at room temperature, about 20° C. to 22° C., so as to provide a composition that can be generally easily used and cured under ambient conditions. General classes of such compounds include acids, aldehydes, isocyanates, acid chlorides, sulphonyl chlorides, mixtures thereof and the like. In one embodiment preferred amine reactive compounds are acids. Both Bronstead and Lewis acids may be used. Pocius, U.S. Pat. No. 5,718,977 describes the preferred acid compounds at column 9, line 1 to 15 incorporated herein by reference. The most preferred acids are acrylic acid and methacrylic acid.

In another preferred embodiment the compositions of the present invention further comprises an effective amount of an isocyanate containing compound (a decomplexing agent) that is reactive with the complexed amine so as to liberate the organoborane and to initiate polymerization. The amine reactive compound liberates organoborane by reacting with the amine, thereby removing the organoborane from chemical attachment with the amine. The isocyanate containing compounds react with the amine present in the composition to form a urea, polyurea or polyurethane/urea phase. When an excess of isocyanate containing compound is used, little or no free amine is present in the resulting product. By eliminating the presence of free amine the plasticizing impact of the amine is prevented. Further the urea or polyurea present improves the heat resistance of the resulting product.

Preferably the isocyanate containing compound is any isocyanate compound that decomplexes the organoborane amine complex. Preferably the isocyanate is a polyisocyanate having nominally 2 or greater isocyanate moieties per compound. Isocyanate compounds useful are disclosed in U.S. Pat. No. 5,872,197, which is incorporated herein by reference. Among more preferred isocyanate containing compounds are polymeric versions of methylene diphenyl diisocyanate, isophorone diisocyanate, hexamethylene diisocyanate, toluene diisocyanate, isomers or bis isocyanatomethyl cyclohexane, tetramethylxylyl diisocyanate, and the like.

Preferably the amount of urea or polyurea present in the resulting polymerized product is about 5 percent by weight or greater, more preferably about 10 percent or greater, and most preferably about 15 percent or greater. Preferably the amount of polyurea present in the resulting polymerized product is about 50 percent or less, more preferably about 45 percent or less and most preferably about 40 percent or less. Percent urea means the percent by weight of the urea/urethane phase in the final product. This can be generally determined by adding the weight of the isocyanate and amine (and any other isocyanate reactive compounds present) and dividing this sum by the total weight of the ingredients.

In another embodiment the two part polymerizable composition of this invention includes a polymerized portion comprising polymerized compound capable of free radical polymerization and a second part comprising the organoborane amine complex and one or more unpolymerized or partially polymerized compounds having ring opening heterocyclic moieties. In a preferred embodiment the ring opening polymerization of heterocyclic compounds is initiated by contacting the heterocyclic compounds with a Lewis acid catalyst. The two portions can be miscible, partially miscible or immiscible. In a preferred embodiment the polymerized composition comprises two phases, one based on the compounds which polymerize through olefinic bonds and a second which polymerizes by a ring opening reaction of a heterocyclic moiety. The cured compositions of the invention preferably contain two regions that in many cases are not miscible. In some embodiments the two regions are separate phases or are interpenetrating networks of two different polymers. The two regions can be chemically bonded to one another if the composition includes a crosslinking compound.

The compound containing a heterocyclic ring opening moiety can be any monomer, oligomer or prepolymer containing a heterocyclic moiety capable of ring opening and polymerization. The heteroatom in the heterocyclic moiety is preferably nitrogen, oxygen or sulfur, with nitrogen and oxygen being preferred and oxygen being most preferred. Preferably the heterocyclic moiety is a 3 membered ring. Preferred heterocyclic moieties are oxirane and aziridine moieties, with oxirane moieties being most preferred. Examples of such oxirane containing materials are diglycidylether of bisphenol A, tris 2-3-epoxypropylisocyanurate, tetraphenylolethane glycidylether, poly(phenyl glycidylether-co-formaldehyde), poly(phenyl glycidylether-co-dicyclopentadiene, and trimethylopropane triglycidyl ether, any other glycidyl modified aliphatic oxirane containing material, tetraglycidylmethyleneaniline, glycidylether modified poly(dimethylsiloxane), and any other glycidyl ether, glycidyl ester or glycidyl amine. Aziridine, as used herein, is refers to a three membered ring having a nitrogen in the ring. Examples of useful aziridine containing molecules are trimethylolpropane tris[2-methyl-1-aziridinepropionate], pentaerythritol tris[3-(1-aziridinyl)propionate], 2,4,6-Tris-aziridin-1-yl-(1,3,5)triazine, 2,3 diphenylaziridine, and 1-butyrylaziridine.

The adhesive compositions of the present invention may comprise one or more compounds, oligomers or prepolymers having a siloxane backbone and reactive moieties capable of polymerization and optionally a catalyst for the polymerization of the one or more compounds, oligomers or prepolymers having a siloxane backbone and reactive moieties capable of polymerization.

Alternatively, the adhesive suitable for use in the present invention is a one part polymerizable composition comprising an organoborane amine complex; one or more of monomers, oligomers or polymers having olefinic unsaturation which is capable of polymerization by free radical polymerization; and a compound which has siloxane groups in its backbone and contains a moiety which when exposed to moisture releases an acid capable of decomplexing the organoborane amine complex. This composition can be polymerized by exposing the composition to atmospheric moisture under conditions such that part decomposes to form an acid, which causes the organoborane amine complex to disassociate and initiate polymerization.

The compounds, oligomers or prepolymers having a siloxane backbone and reactive moieties capable of polymerization useful in this invention include any compound, oligomer or prepolymer containing siloxane units in the backbone and which have reactive groups which can polymerize under reasonable reaction conditions. Oligomer as used herein means a few identifiable chemical units linked together through reactive moieties. Oligomer can be thought of as a small polymer having only a few units, for instance a dimer, trimer, tetramer or pentamer. Mer is used to refer to one of the basic identifiable chemical units of an oligomer or polymer and often is the residue of the compound or compounds from which the oligomer or polymer is derived. Prepolymer means compounds having several basic identifiable chemical units which comprise the polymer, that is, several mers, which also have reactive groups which allow the compounds to further react.

In practice, a prepolymer is a mixture of polymers having varying numbers of basic identifiable chemical units of the polymer and may contain some amount of oligomers. The term having a siloxane backbone means herein that the backbone of the compounds, oligomers and/or polymers contains basic identifiable chemical units having silicone and oxygen atoms in the backbone. Preferably the basic identifiable chemical units of siloxane correspond to the formula wherein R is separately in each occurrence hydrogen, alkyl, alkenyl, aryl, alkaryl, or aralkyl having up to about 20, preferably up to about 8, carbon atoms and where R is not equal to hydrogen it can further comprise one or more reactive moieties capable of polymerization. The term reactive moieties capable of polymerization mean any moieties which react with one another or with other reactive moieties to form oligomers, prepolymers or polymers. Examples of preferred reactive moieties capable of polymerization include vinyl moieties, hydrolyzable moieties, hydroxyl moieties, hydrides, isocyanate moieties, amines or in the case of cyclic siloxanes is the reactive end formed by ring opening; and the like. More preferred reactive moieties capable of polymerization include vinyl moieties, hydrolyzable moieties, hydroxyl moieties, hydrides and the like. Where two or more reactive moieties capable of polymerization are present per reactive silicon group, they may be the same or different.

One class of siloxane polymers which are useful in the practice of this invention include vinyl functionalized siloxanes which may be further polymerized via free radical or addition mechanisms. Vinyl functionalized siloxanes comprise compounds, oligomers, and prepolymers which have siloxane units in the backbone and have polymerizable olefinic moieties. The vinyl functionalized siloxanes may contain hydrocarbylene and/or fluorocarbylene units in the backbone.

Another class of siloxane containing compounds, oligomers or prepolymers useful in this invention are siloxanes having terminal silanol groups or hydrolyzable groups which upon exposure to moisture form silanol groups. Terminal silanol groups on siloxane chains allow the compounds, oligomers or prepolymers react via condensation when catalyzed. These reactions proceed at room temperature as either a one part or two-part polymerization system. This reaction occurs at room temperature in the presence of silanol condensation catalysts. Silanol condensation catalysts are well known in the art.

The adhesive compositions of the invention optionally may contain a stabilizing amount of an alicyclic hydroxylamine or a dihydrocarbyl hydroxyl amine; or a nitroxyl or nitrile oxide thereof. Alicyclic hydroxyl amine means a nitrogen containing aliphatic heterocycle wherein the nitrogen atom has a hydroxyl moiety bound thereto. The hydrocarbyl groups on the dihydrocarbyl hydroxyl amine and the alicyclic hydroxyl amines can be substituted with any substituent which does not significantly impact the performance of the adhesive compositions of this invention.

Preferred dihydrocarbyl hydroxyl amines and alicyclic hydroxyl amines correspond to the formula $(R^{50})_2N\text{---}OH$ wherein $R^{50}$ is independently in each occurrence a hyrocarbyl moiety or the two $R^{50}$ may combine to form a cyclic ring, wherein the hydrocarbyl groups or cyclic ring may be substituted with one or more substituents which do not interfere with the function of the compounds in this invention.

In one embodiment, the nitroxyl or nitrile oxides are illustrated by the formula $(R^{50})_2-N-O.$ wherein $R^{50}$ is described above.

Preferably $R^{50}$ is independently in each occurrence a $C_{2-30}$ alkyl, alkaryl or aryl moiety or two $R^{50}$ form a $C_{2-30}$ cycloalkyl moiety, more preferably a $C_{10-20}$ alkyl, alkaryl or aryl moiety and two $R^{50}$ are $C_{2-7}$ cycloalkyl; with $C_{10-20}$ alkyl moieties being even more preferred. Among preferred dihydrocarbyl hydroxyl amines are hydroxylamine freebase from BASF, hydroxylamine derivatives from Mitsui Chemicals America, Inc., N-hydroxyl bis (N-benzyl)amine available as BNX 2000 from Mayzo Inc. and Irgastab FS Products from Ciba Specialty Chemicals which contains oxidized bis(hydrogenate tallow alkyl) amine, also described as bis(N-dodecyl) N-hydroxyl amine and Xenoxyl available from Avecia, Inc. and having the structure The dihydrocarbyl hydroxyl amines, alicyclic hydroxyl amines or nitrile oxides thereof are utilized in sufficient amounts to stabilize the compositions of the invention. Preferably the hydroxyl amines are used in an amount of about 1 parts per million of the compositions of the invention or greater, more preferably about 2 parts per million or greater and most preferably about 5 parts per million or greater. Preferably the hydroxyl amines are used in an amount of about 100,000 parts per million of the compositions of the invention or less, more preferably about 50,000 parts per million or less, even more preferably about 10,000 parts per million or less and most preferably about 3,000 parts per million or less.

The adhesive compositions may further comprise additional additives such as thickeners, preferably a medium to high (about 10,000 to 1,000,000) molecular weight polymethyl methacrylate; an elastomeric material, such as chlorinated or chlorosulphonated polyethylenes, block copolymers of styrene and conjugated dienes and certain graft copolymer resins such as particles that comprise rubber or rubber-like cores or networks that are surrounded by relatively hard shells, these materials often being referred to as "core-shell" polymers; cross-linking agents; peroxides; inhibitors; colorants; fillers; solvents, etc. The adhesive composition may also contain a reactive or nonreactive diluent to balance the volumes of the two parts of the composition so as to achieve a commercially acceptable volumetric ratio of the two components.

In one embodiment, the two-parts of the adhesive are combined through tubes with plungers. The ratio at which the two-parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two-parts of the adhesive at a convenient mix ratio. Some common mix ratios are 1:1, 2:1, 4:1 and 10:1, but preferably less than about 10:1 and more preferably less than about 4:1 and most preferably about 1:1.

Preferably the mixed two-part compositions of the invention have a suitable viscosity to allow application without dripping. Preferably, the viscosities of the two individual components should be of the same order or magnitude. Preferably the mixed compositions have the viscosity of about 100 (0.1 Pa·S) centipoise or greater, more preferably about 1,000 (1.0 Pa·S) centipoise or greater and most preferably about 5,000 (5.0 Pa·S) centipoise or greater. Preferably the adhesive compositions have a viscosity of about 1,000,000 (1000 Pa·S) centipoise or less, more preferably about 500,000 (500 Pa·S) centipoise or less and most preferably about 30,000 (30 Pa·S) centipoise or less.

The pipe of the present invention can be a pressure pipe for gas, liquid and slurry distribution, a pipe for hot and cold water distribution, an irrigation or drip-irrigation tubing, pipe for water service, line pipe, and the like. The pipe can also be a non-pressure pipe, such as drain, waste and vent (DWV) pipe, thin-wall DWV pipe, conduit pipe, underdrain piping, sewer pipe and the like. Pipes can be, solid wall, cellular core (sometimes called foamed core), multilayer plastic pipe, composite metal/plastic pipe, conduit, structural pipe, truss pipe, ribbed-walled pipe, corrugated-wall pipe, and the like. Optionally, the layers of multilayer plastic pipe and/or composite metal/plastic pipe used in the present invention can be bonded with an effective amount of a curable one or two part adhesive composition comprising an effective amount of a organoborane amine complex initiator and one or more monomers, oligomers, polymers or mixtures thereof having olefinic unsaturation which is capable of polymerization by free radical polymerization.

The pipe of the present invention can preferably be used to repair or remediate an existing piping system in need of repair. For example, underground piping, especially water, waste, and/or sewage piping, which has failed due to age via corrosion, erosion, breakage, soil shifting, and the like. A leak-free replacement or repair system that can be placed within the existing pipe system or "line" the existing pipe system without expensive excavation is referred to as a "trenchless" pipe repair technique. The method of joining pipe of the present invention is ideal for such a trenchless pipe repair.

An especially preferred method of applying the curable one or two part adhesive composition of the present invention is via robotics. Robotic application of the curable one or two part adhesive composition helps to control overflow, cure time, and reduce VOC emissions.

Prior to joining a pipe and an object, the joining surfaces may be treated by means such as corona, flame, sulfonation, plasma, and the like. However, in the present invention surface treatment of the joining surfaces may not be required prior to joining.

Figure 1:
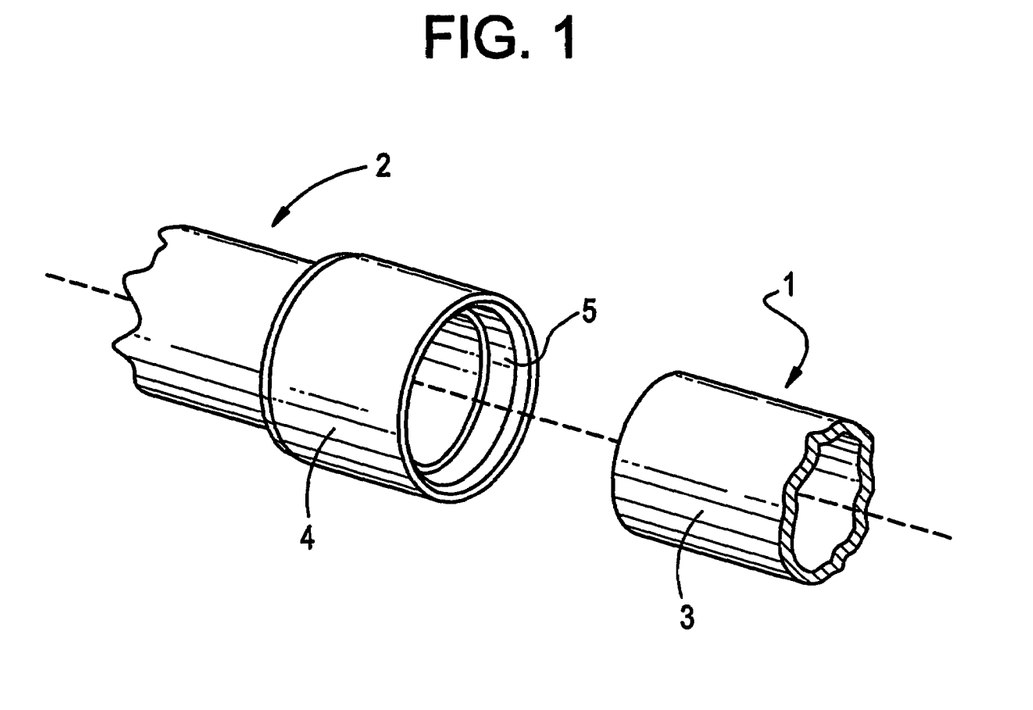
FIG. 1 is an exploded perspective view of a spigot and bell joint between a pipe and fitting.

Any object is suitable which provides adequate surface area to allow for joining the object to the pipe by the method of the present invention. For example, the object can be a fitting which can be insert, butt-type, threaded, bell (sometimes called socket), and the like. Preferred are fittings in which a first surface of the pipe is a different diameter than a second surface of the fitting and the first surface of the pipe is inserted over the second surface of the fitting or, in the alternative, the first surface of the pipe is inserted into the second surface of the fitting, for example a bell fitting which fits over the outside diameter of the end of a pipe (sometimes referred to as a spigot), FIG. 1. A preferred joint between pipe 1 and fitting 2 is a spigot and bell joint where the end of the pipe forms the spigot 3 and the fitting has a bell 4 having an open end for receiving the spigot. The exterior surface of the end of the pipe 3 being inserted into, and mating with, the interior surface of the bell 5 of the fitting 2. An effective amount of adhesive is applied to the exterior surface of the spigot 3, the interior surface of the bell 5 or both surfaces. An effective amount of adhesive is an amount that yields a strong and monolithic joint. Preferably, the adhesive is a uniform layer between the pipe 1 and fitting 2. More preferably, there is a gap between part or all of the exterior mating surface of the spigot 3 and part or all of the interior mating surface of the bell 5 when the spigot 3 is inserted into the bell 4 to form the joint. The gap is for receiving an effective amount of adhesive preferably a uniform layer of an effective amount of adhesive to join the pipe and the fitting.

Figure 2:
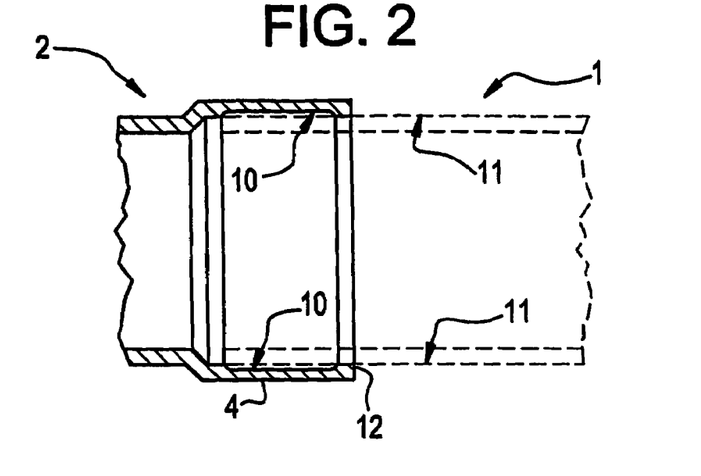
FIG. 2 is a cross section of a longitudinal view of a spigot and bell joint with a gap formed by a channel.
Figure 3A:
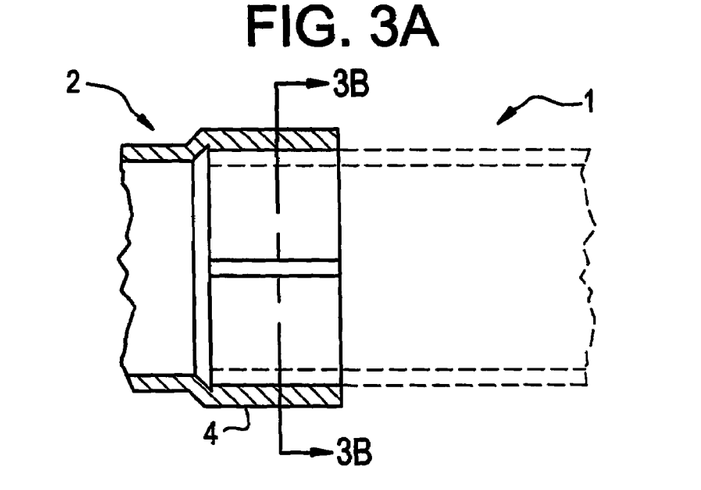
FIG. 3 is a cross section of a longitudinal view using alignment guides to form a uniform gap between a spigot and bell joint.
Figure 3B:
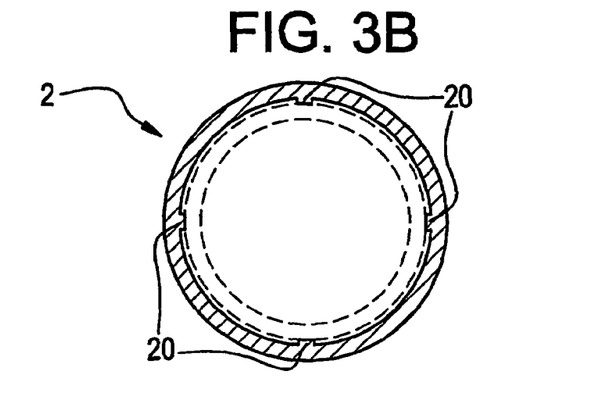
Figure 4:
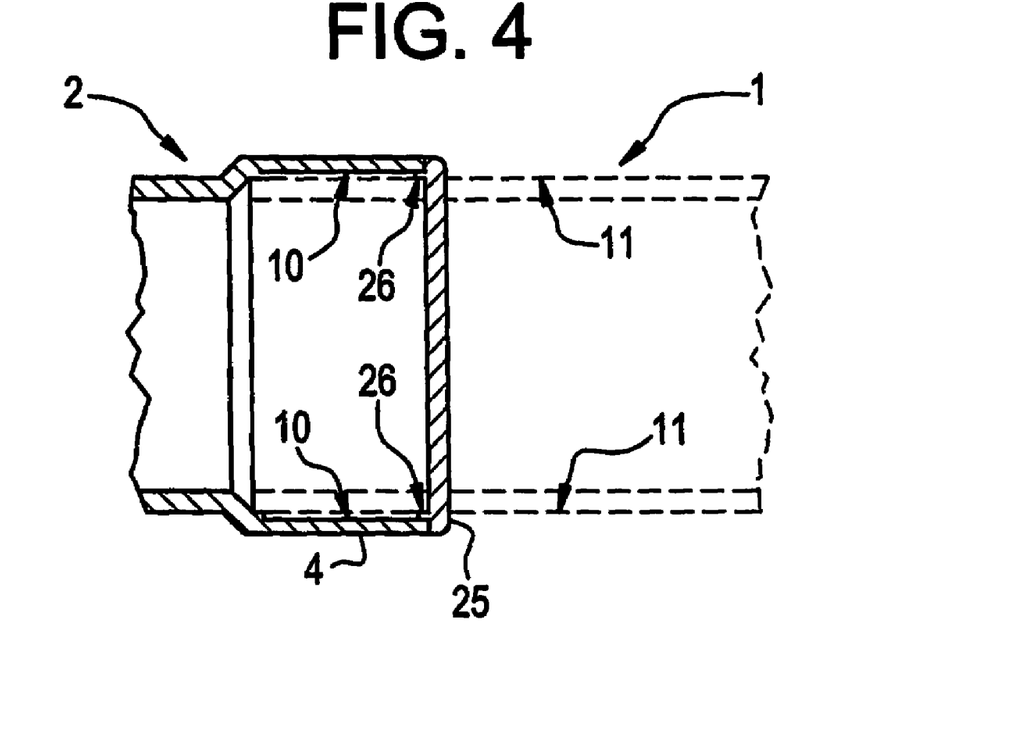
FIG. 4 is a cross section of a longitudinal view using a guide ring to form a uniform gap between a spigot and bell joint.
Figure 5:
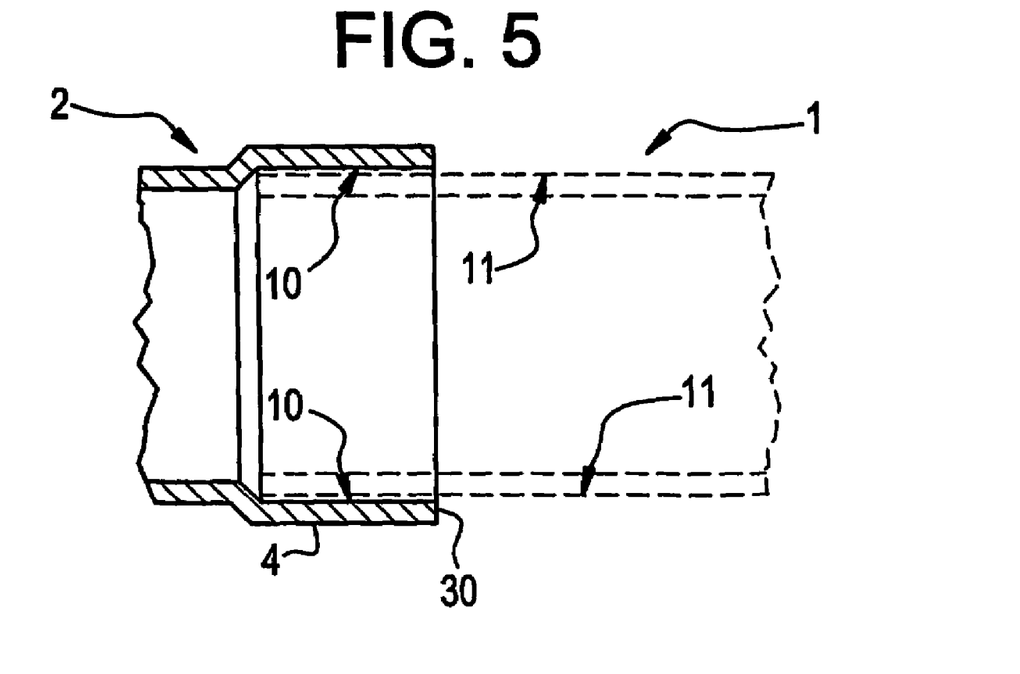
FIG. 5 is a cross section of a longitudinal view using a mesh collar to form a uniform gap between a spigot and bell joint.

Any means to form the gap between the spigot and bell is acceptable. For example, a bell fitting 2 can be molded having a larger interior surface diameter (bell inside diameter) 10 than the spigot exterior surface diameter (pipe outside diameter) 11 to produce a gap of the desired dimension (alternatively called depth, thickness, distance, or the like). Preferably the gap has a uniform dimension between the bell and spigot. Any method to provide a uniform dimension between bell and spigot is acceptable. For example, glass spheres having a diameter equaling the gap between a bell and spigot can be mixed in with the adhesive before applying the adhesive to the interior surface of the bell 5, exterior surface of the spigot 3, or both surfaces; the gap may be a channel 12 in the bell 3 (FIG. 2); another means to provide a gap is by making the inside diameter (ID) of the bell 10 slightly larger than the outside diameter (OD) of the spigot 11 wherein there are one or more alignment guides 20 raised from in the interior surface of the bell 5 which contacts the exterior surface of the spigot 3 (FIG. 3); another means to provide the gap is by making the ID of the bell 10 slightly larger than the OD of the spigot 11 wherein the end of the bell in which the spigot is inserted is fitted with a guide ring or flange 25 having a smaller ID 26 than the bell 4 (FIG. 4); and yet another means to provide a uniform gap between the bell 4 and the spigot 3 is by making the ID of the bell 10 slightly larger than the OD of the spigot 11 and fitting the interior surface of the bell or the exterior surface of the spigot with a screen or mesh collar 30 of constant thickness which contacts the exterior surface of the spigot 3 when the spigot 3 is inserted into the bell 4 (FIG. 5). There are no particular restraints as to how the gap is located between the bell and the spigot, it may run longitudinally or transversely relative to the axis (length) of the pipe. If the gap is transverse to the axis of the pipe, it can be at any angle from greater than 0° to less than 180°.

When used, the depth of the gap is somewhat dependent on the size of the pipe. Generally, for smaller pipe, such as pipe with an outside diameter of less than 8 inches, the gap is equal to or less than about 0.03 inch, preferably equal to or less than about 0.02 inch. Generally, the gap is equal to or greater than about 0.0001 inch, preferably 0.001 inch. A preferred gap measures about 0.01 inch. An example of a nominal fitting with a 0.01 inch gap based on the bell interior surface diameter ($b_d$) (that is, the bell ID) and spigot exterior surface diameter ($s_d$) (i.e., the pipe OD) is:

$$b_d = s_d + 0.01 \text{ inch}$$

For larger pipe, such as pipe having an outside diameter of 8 inches or more, the depth of the gap is preferably the sum of the manufacturing tolerances of the pipe and object (for example, spigot and bell) plus 0.03 inch.

Figure 6:
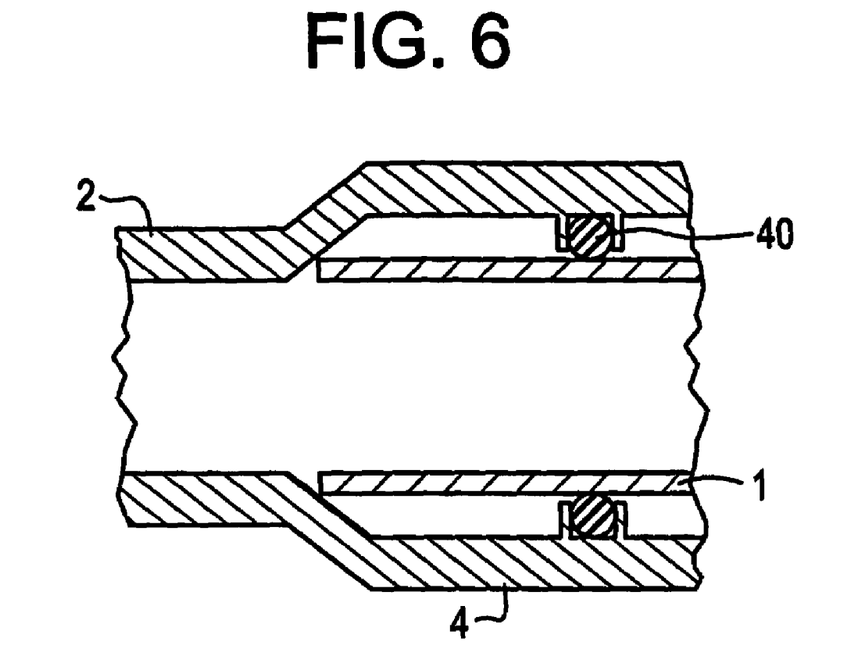
FIG. 6 is a cross section of a longitudinal view of a spigot and bell joint with a gasket.
Figure 7:
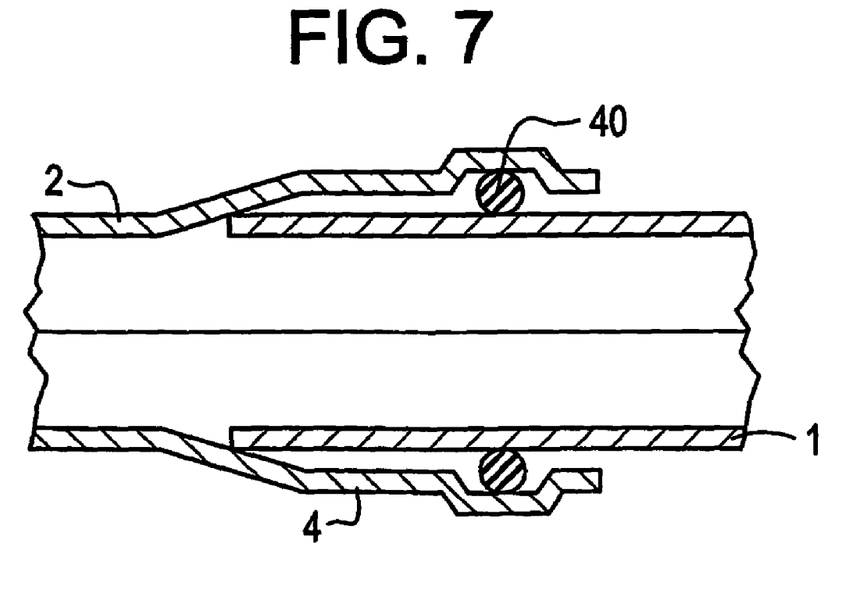
FIG. 7 is a cross section of a longitudinal view of a spigot and bell joint with a gasket.

An alternative joint between pipe 1 and fitting 2 is a gasket joint (FIGS. 6 and 7). Such a joint provides a secondary seal. The gasket 40 also holds the joint during cure to maintain a uniform gap in the joint. For a good discussion of gasket joints see ASTM Standard D 3139-98 Standard Specification for Joints for Plastic Pipes Using Flexible Elastomeric Joints.

Figure 8:
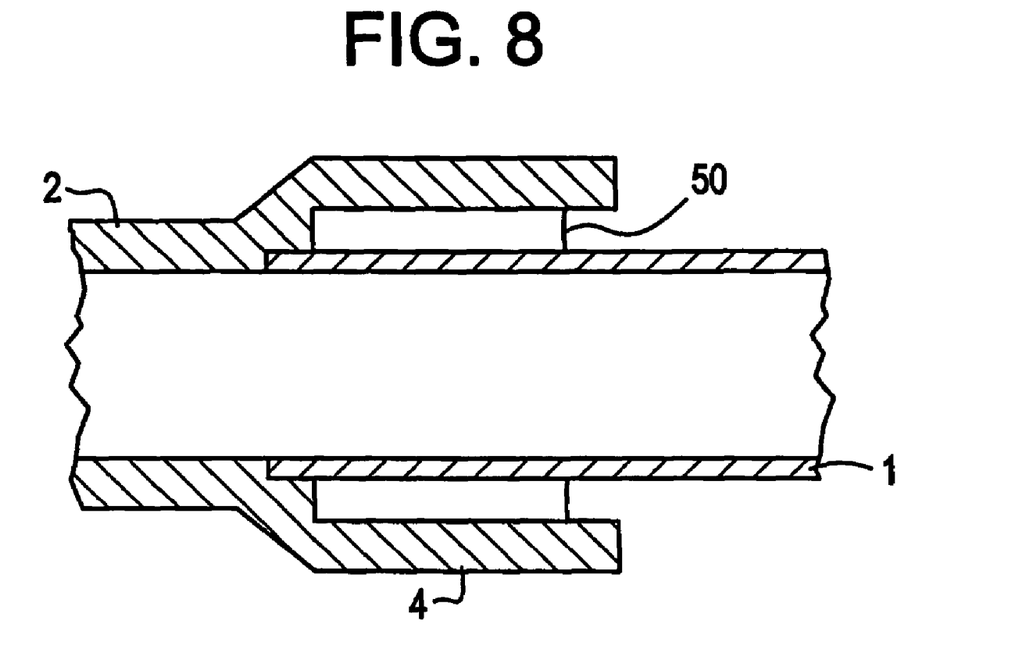
FIG. 8 is a cross section of a longitudinal view of a spigot and bell joint comprising a serrated washer.
Figure 9:
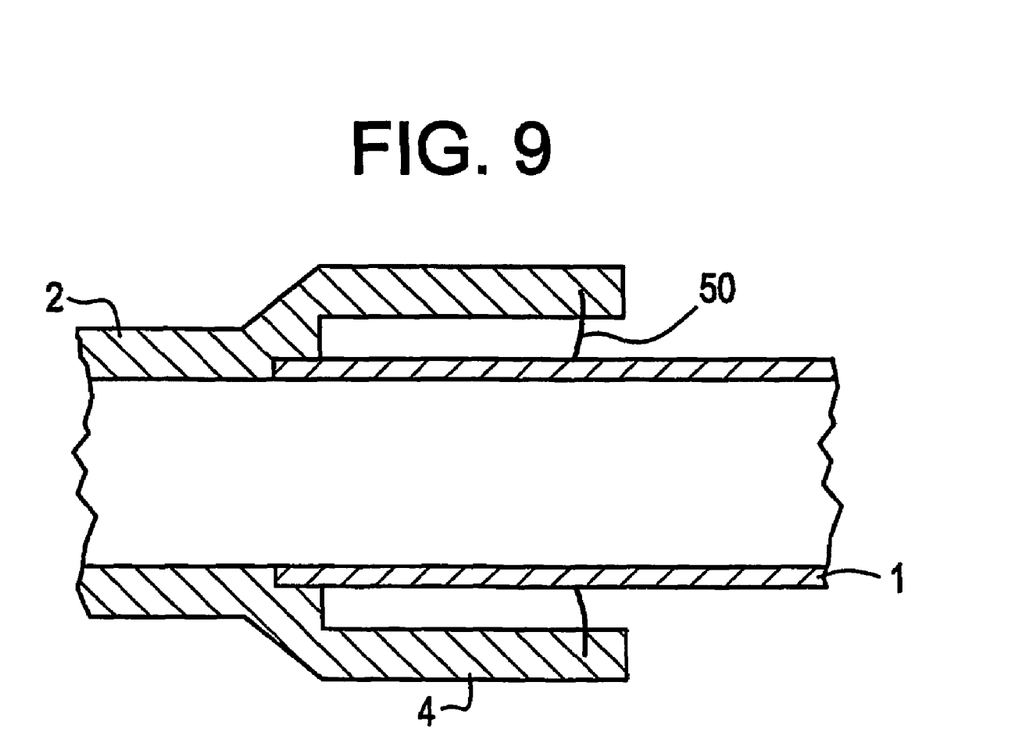
FIG. 9 is a cross section of a longitudinal view of a spigot and bell joint comprising a molded-in serrated washer.

An alternative joint between pipe 1 and fitting 2 is a serrated washer 50 that is deflected via an interference fit to adhere to the bell and spigot and maintains a uniform gap in the joint by holding the joint in place during the cure (FIG. 8). A relief in the inside diameter of the bell may be molded or machined to locate and secure the serrated washer in place. Another design with a serrated washer is to mold the serrated washer into the bell (FIG. 9). A metal or other material may be utilized for the serrated washer. A preferable material for the serrated washer is stainless steel.

Preferably the method of the present invention has VOC emissions of equal to or less than about 650 grams per liter (g/l), preferably equal to or less than about 520 g/l, more preferably equal to or less than about 510 g/l, even more preferably equal to or less than about 490 g/l, even more preferably equal to or less than about 400 g/l, even more preferably equal to or less than about 285 g/l, even more preferably equal to or less than about 270 g/l, even more preferably equal to or less than about 250 g/l, and most preferably equal to or less than about 17 g/l.

While specific embodiments of the invention have been shown and described in detail to illustrate the inventive principles, it will be understood that the invention may be embodied otherwise without departing from such principles.

The invention claimed is:

1. A method for joining a pipe having a first surface to an object having a second surface comprising the steps of:
   (i) applying an effective amount of a curable one or two part adhesive composition to the first surface of the pipe, the second surface of the object or to both surfaces, wherein the adhesive comprises
      (a) a boron containing initiator compound comprising an organoborane amine complex having the structure or wherein B represents boron;

$R^2$ is separately in each occurrence $C_{1-10}$ alkyl, $C_{3-10}$ cycloalkyl, or two or more of $R^2$ may combine to form a cycloaliphatic ring;

Q is a hydrolyzable moiety;

$R^{11}$ is independently in each occurrence hydrogen, alkyl, alkoxy, alkenyl, alkyl amino or corresponds to the formula $((CR^{14}H)_rO)_n$—$(NR^4)$—$(CH_2)_o$—$NH_2$ with the proviso that at least $(R^{11})'$ is a primary amine leave this as is;

$R^{12}$ is independently in each occurrence hydrogen, alkyl, aryl, alkoxy, and may further contain one or more primary, secondary or tertiary amines;

$R^{14}$ is separately in each occurrence hydrogen or alkyl;

$R^4$ is hydrogen, $C_{1-10}$ alkyl, $C_{6-10}$ aryl or $C_{7-10}$ alkaryl;

a is a number of from 1 to 10;

b is a number of from 0 to 1;

m is separately in each occurrence a whole number of 1 or greater;

p is separately in each occurrence a number of from 1 to 3;

q is separately in each occurrence an integer from 1 to 2 wherein the sum of p and q on each silicon atom is 3;

n is separately in each occurrence an integer of about 4 to about 400;

o is separately in each occurrence an integer of about 1 to about 9; and r is separately in each occurrence an integer of 2 or 4, (b) one or more monomers, oligomers, polymers or mixtures thereof having olefinic unsaturation which is capable of polymerization by free radical polymerization, and (c) optionally a decomplexing agent and (ii) joining the first surface of the pipe with the second surface of the object wherein the pipe and object independently comprise one or more polyolefin.

2. The method of claim 1 wherein the object is a fitting.

3. The method of claim 2 wherein the pipe comprises a spigot having an exterior surface and the fitting comprises a bell having an interior surface and an open end for receiving the spigot whereby (i) the curable adhesive composition is applied to the exterior surface of the spigot, the interior surface of the bell or to both surfaces and (ii) the fitting and pipe are joined by inserting the spigot into the bell.

4. The method of claim 3 further comprising a gap for receiving the adhesive said gap is positioned between part or all of the mating exterior surface of the spigot and the interior surface of the bell.

5. The method of claim 4 wherein the gap has a uniform thickness.

6. The method of claim 5 wherein the gap comprises a channel in the bell, alignment guides raised from the interior surface of the bell which contact the exterior surface of the spigot, a guide ring fitted into an end of the bell said guide ring having a smaller internal diameter than the bell, a mesh collar of constant thickness, a gasket, a serrated washer, or combinations thereof.

7. The method of claim 1 wherein the pipe and the object comprise polypropylene.

8. The method of claim 1 wherein the pipe and the object comprise polyethylene.

9. The method of claim 1 wherein the pipe is a first polyolefin and the object is a second polyolefin different from the first polyolefin.

10. The method of claim 1 comprising a decomplexing agent selected from a Lewis acid, a BrØnsted acid, an anhydride, an isocyanate, a sulfonic acid chloride, methacrylic acid, or an adduct of maleic anhydride and hydroxyethyl methacrylate.

11. The method of claim 1 wherein the adhesive further comprises an effective amount of an isocyanate containing compound; one or more unpolymerized or partially polymerized compound haying ring opening heterocyclic moieties and optionally a Lewis acid catalyst capable of initiating polymerization of the compound containing heterocyclic moieties; one or more compound, oligomer or prepolymer haying siloxane groups and reactive moieties in its backbone capable of polymerization; one or more compound, oligomer or prepolymer having siloxane groups in its backbone which contain a moiety which when exposed to moisture forms an acid capable of decomplexing the organoborane amine complex; or mixtures thereof.

12. The method of claim 1 wherein the adhesive comprises a polymerizable acrylate monomer.

13. The method of claim 1 having a VOC emission of less than about 650 g/l.

14. The method of claim 1 having a VOC emission of less than about 270 g/l.

* * * * *